June 24, 1930.   J. KOVACICH   1,768,077
NOODLE CUTTER
Filed Dec. 26, 1928   4 Sheets-Sheet 1
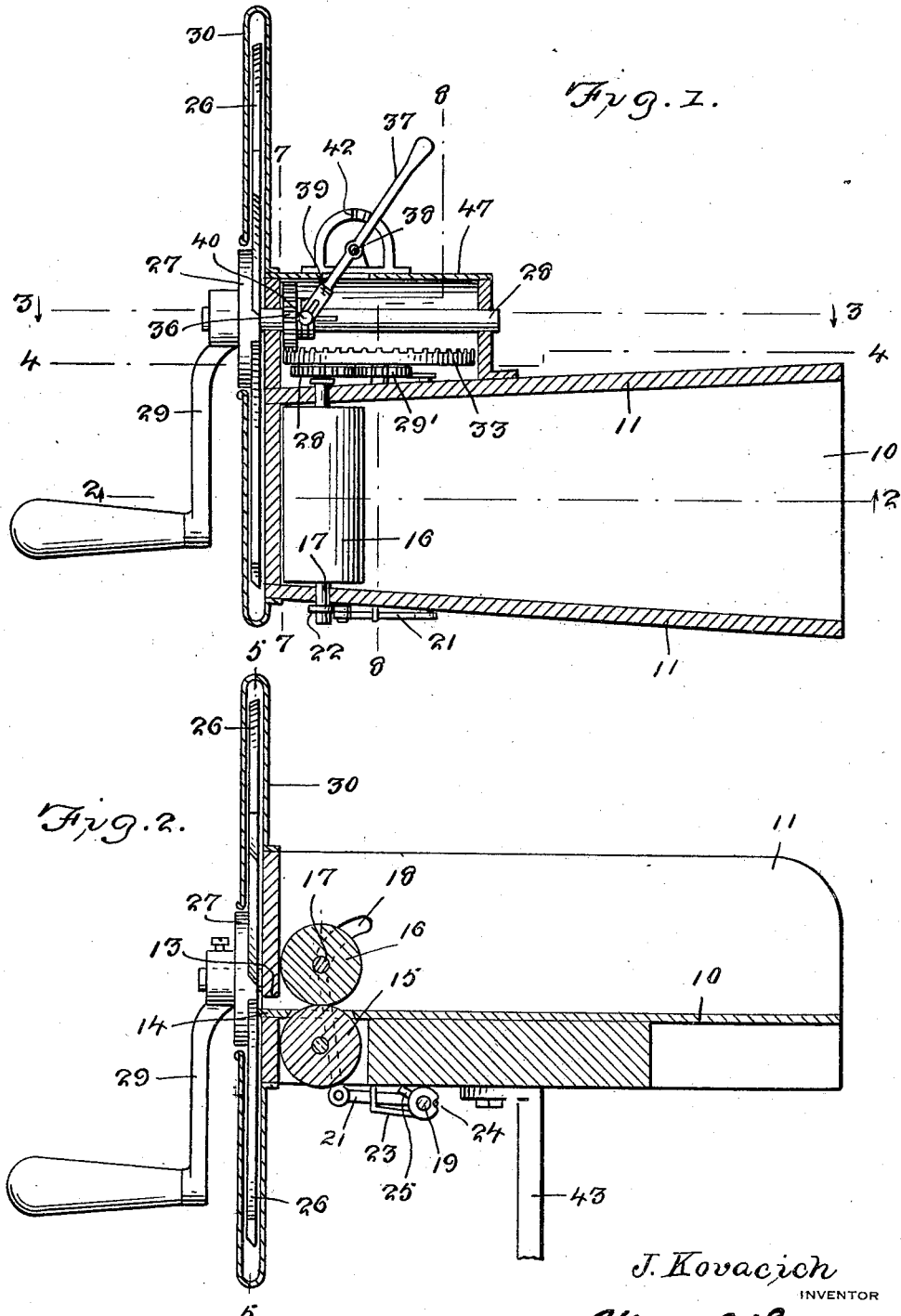

June 24, 1930.  J. KOVACICH  1,768,077
NOODLE CUTTER
Filed Dec. 26, 1928  4 Sheets-Sheet 2

J. Kovacich
INVENTOR
BY Victor J. Evans
ATTORNEY

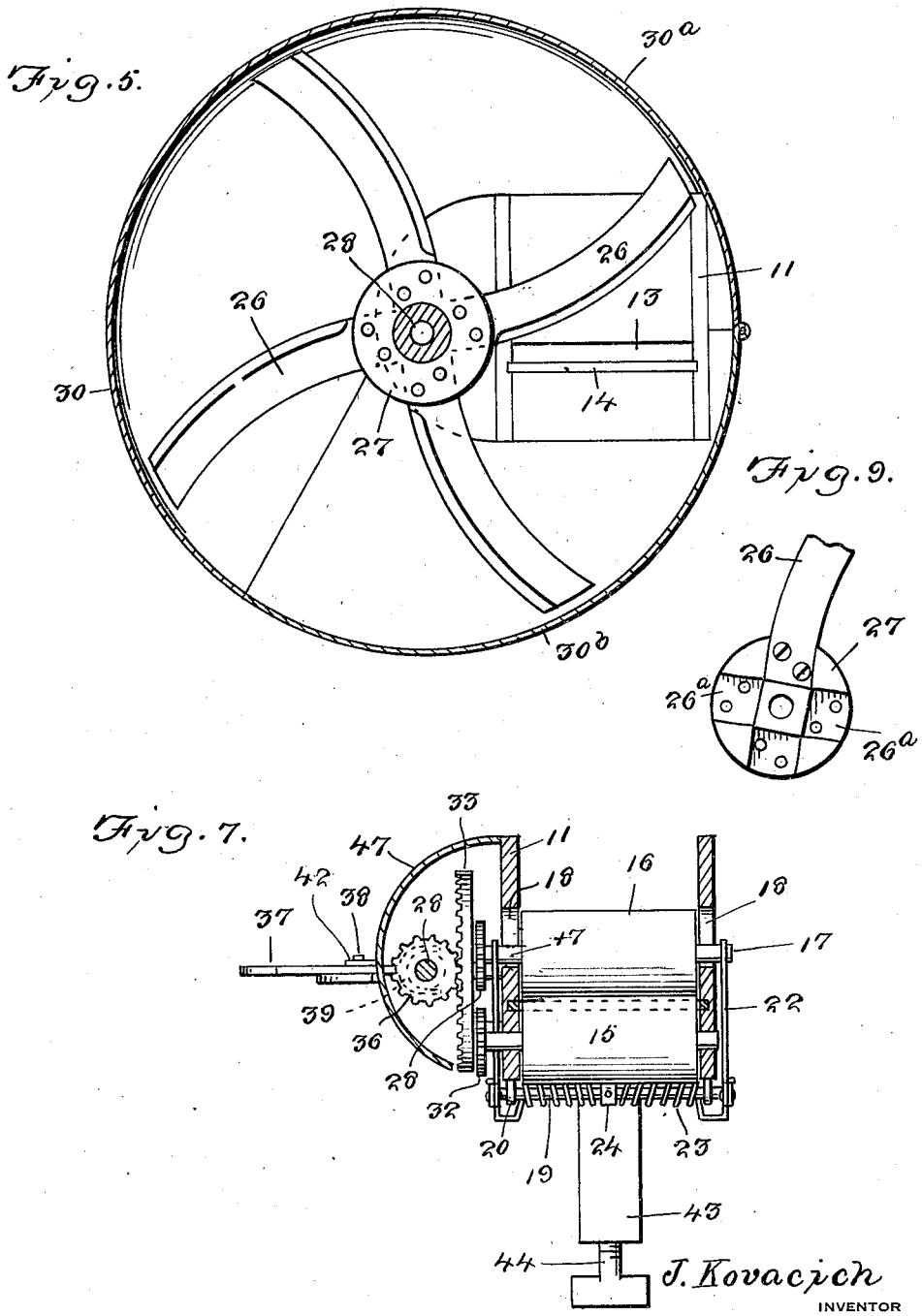

June 24, 1930.  J. KOVACICH  1,768,077
NOODLE CUTTER
Filed Dec. 26, 1928  4 Sheets-Sheet 4
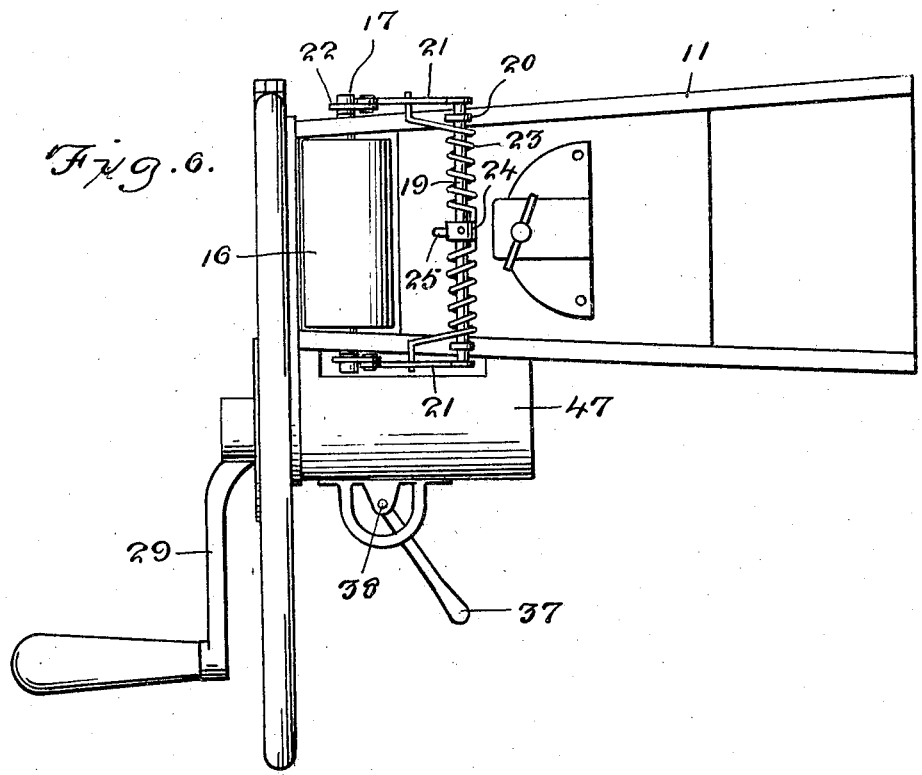
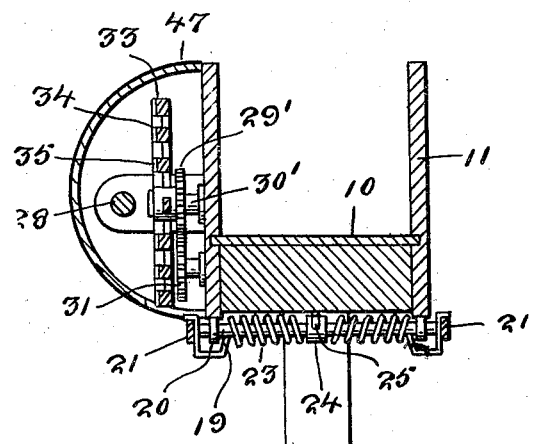
J. Kovacich
INVENTOR
BY *Victor J. Evans*
ATTORNEY Patented June 24, 1930

1,768,077

UNITED STATES PATENT OFFICE

JOSEPH KOVACICH, OF VIRGINIA, MINNESOTA

NOODLE CUTTER

Application filed December 26, 1928. Serial No. 328,501.

This invention relates to improvements in machines for cutting noodles and has for an object the provision of a machine wherein the dough is fed to a pair of pressure rollers and pressed to the desired thinness, and afterward cut into strips.

Another object of the invention is the provision of means for mounting the pressure rollers so that they will yieldingly press upon the dough, together with means for mounting and driving this roller to provide for yielding movement.

Another object of the invention is the provision of means for actuating the cutter, and means operated by the cutter actuating means to operate the pressure rollers.

With the above and other objects in view, the invention further includes the following novel features and details of construction, to be hereinafter more fully described, illustrated in the accompanying drawings and pointed out in the appended claim.

In the drawings:

Figure 1 is a horizontal sectional view of a noodle cutting machine constructed in accordance with the invention.

Figure 2 is a section taken substantially on the line 2—2 of Figure 1.

Figure 3:
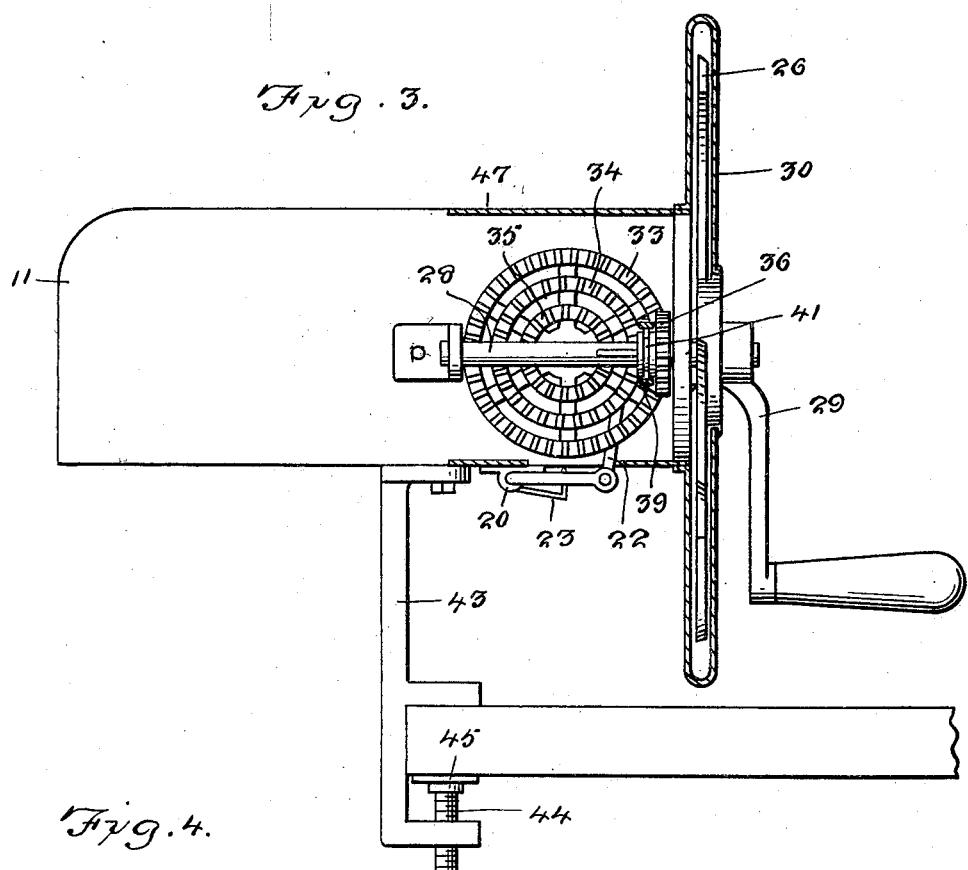
Figure 4:
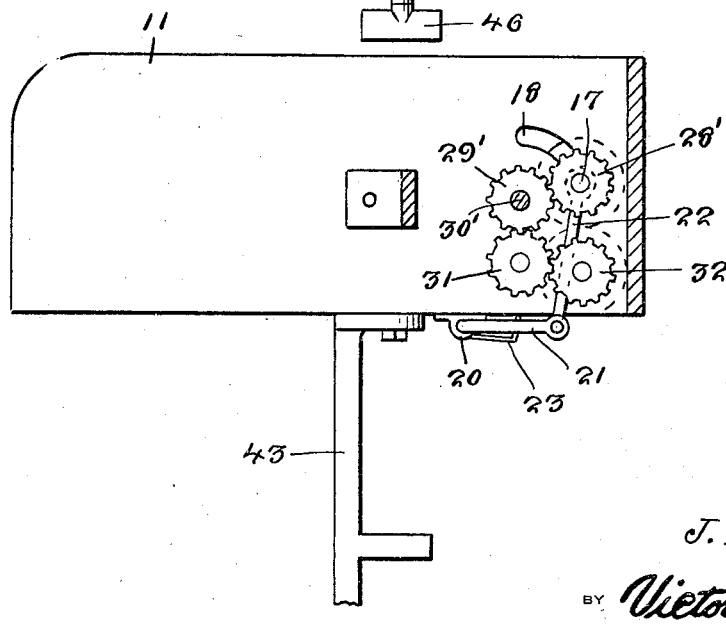

Figures 3 and 4 are sections on the lines 3—3 and 4—4 respectively of Figure 1.

Figure 5 is a section on the line 5—5 of Figure 2.

Figure 6 is a bottom plan view of the machine.

Figures 7 and 8 are sections taken respectively on the lines 7—7 and 8—8 of Figure 1.

Figure 9 is a detail view of the hub of the rotary cutter and a portion of one of the blades.

Referring to the drawings in detail wherein like characters of reference denote corresponding parts, the invention as shown comprises a trough having a bottom 10 and side walls 11, the latter preferably converging toward the discharge end of the trough. This discharge end is provided with a throat 13 for the passage of the dough, the bottom wall of this throat being extended to provide a stationary blade 14. This blade cooperates with movable blades to be hereinafter described.

Mounted beneath the bottom 10 of the trough is a roller 15. This roller projects upward through an opening provided in the bottom of the trough and is adapted to be engaged by a roller 16 located within the trough. This last mentioned roller has its trunnions 17 extending through arcuate slots 18 provided in the opposite side walls 11 of the trough.

The roller 16 is thus mounted for movement toward and away from the roller 15 and is yieldingly forced in a direction toward the roller 15. For this purpose, a rock shaft 19 is mounted in bearings 20 located beneath the trough. The shaft 19 extends transversely of the trough and its opposite ends have secured thereon crank arms 21. These arms are connected by means of rods or links 22 with the trunnions 17 of the roller 16. A spring 23 is coiled upon the shaft 19 and has its opposite ends bearing upon the crank arms 21, while its intermediate portion is engaged by a rotatable member 24 which is mounted upon the shaft 19. This member 24 is provided with spaced openings to receive a pin 25, so that the member 24 may be adjusted and held in adjusted position to regulate the tension of the spring.

The rollers press the dough to the proper thinness and feed the pressed dough to the cutter, the latter consisting of a stationary blade 14 and movable blades 26, the latter being carried by a hub 27. This hub is mounted upon a driving shaft 28 which is rotatable in suitable bearings provided at one side of the trough, while a crank handle 29 secured to the shaft 28 provides means whereby the shaft may be rotated. The blades 26 are detachably secured within recesses 26ª provided in the hub 27. A guard 30 extends around the blades 26. The guard 30 is preferably of sectional construction and includes a section 30ª fixed to the machine, and a section 30ᵇ which is hingedly connected to the fixed section, so that the guard may be opened for adjustment and removal of the cutter blades.

By reference to Figure 5 of the drawings, it will be seen that when the blades are rotated in a clockwise direction, they will travel across the stationary blade 14 with a shearing movement so as to cut the dough as it is fed to the cutter by the rollers 15 and 16.

Mounted upon one of the trunnions of the roller 16 is a pinion 28' which is engaged by a pinion 29', the latter being mounted upon a short shaft 30' which extends from one side of the machine. The pinion 29' drives a pinion 31 and the latter in turn drives a pinion 32 which is fast upon one end of the shaft of the roller 15. The shaft 30' also has secured thereon gears 33, 34 and 35, the gears being of decreasingly small diameter. Slidingly mounted upon the shaft 28 is a pinion 36 which is adapted to engage either of the gears 33, 34 or 35 and may be shifted longitudinally of the shaft 28 to control the speed of travel of the rollers. Shifting of the pinion 36 is effected by means of a lever 37 which is pivotally mounted as shown at 38 and which is provided with a forked inner end 39. This inner end engages studs 40 whose inner ends are received within a groove 41 provided in the hub of the pinion 36. A toothed segment 42 is arranged to hold the lever 37 in adjusted position.

Extending from the bottom of the trough is a bracket 43 which has threadedly engaged therewith a screw 44. The inner end of this screw carries a swiveled disk 45 while its outer end is provided with a thumb piece 46. By means of the construction just described, the machine may be clamped to a table or other suitable support. Dough placed within the trough may be fed to the rollers and pressed and fed by these rollers to the cutters so as to be cut into strips of the proper size for making noodles. The machine is easy and inexpensive to operate, the cutters and rollers being both operated by rotating the crank handle 29.

It is preferred to encase the gearing within a housing 47.

The invention is susceptible of various changes in its form, proportions and minor details of construction and the right is herein reserved to make such changes as properly fall within the scope of the appended claim.

Having described the invention what is claimed is:

In a noodle cutting machine, a feed trough having arcuate slots therein, pressure rollers located adjacent the discharge end of said trough, said rollers including a roller having trunnions extending through the arcuate slots of the trough, a spring influenced rock shaft mounted in bearings and extending transversely beneath the trough, crank arms at opposite ends of the shaft, and rods connecting the crank arms and trunnions to yieldingly force the rollers together, and means to regulate the pressure of the pressure rollers, a cutter at the discharge end of the trough, and means to drive the rollers and cutter.

In testimony whereof I affix my signature.

JOSEPH KOVACICH.